UNITED STATES PATENT OFFICE.

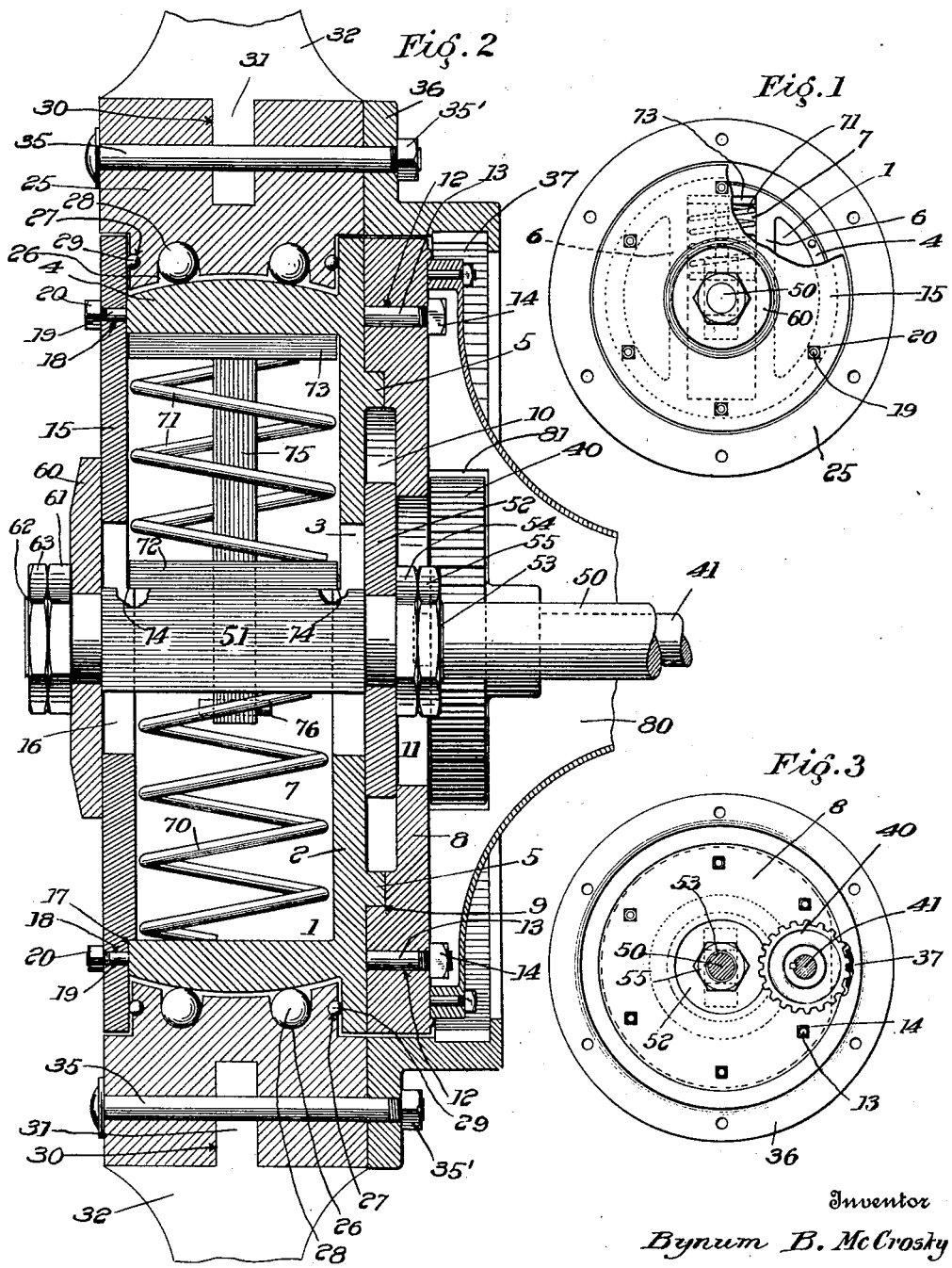

BYNUM B. McCROSKY, OF OAKLAND, CALIFORNIA.

VEHICLE-WHEEL.

1,324,972.   Specification of Letters Patent.   Patented Dec. 16, 1919.

Application filed April 3, 1917. Serial No. 159,413.

*To all whom it may concern:*

Be it known that I, BYNUM B. McCROSKY, citizen of the United States, residing at Oakland, in the county of Alameda and State of California, have invented certain new and useful Improvements in Vehicle-Wheels, of which the following is a specification.

This invention is a resilient vehicle wheel particularly adapted for use on heavy trucks.

The invention comprises improved resilient means arranged within the hub portion of the wheel to absorb the shocks on the wheel as it travels.

The invention comprises certain novel features of construction and combination and arrangement of parts hereinafter described in the specification and pointed out in the appended claims.

In the accompanying drawing which forms a part of this specification, I have illustrated my invention in the form which I consider the best, but it is to be understood that the invention may be embodied in other forms and that the claims are intended to cover the invention in whatever form it may be embodied.

Referring to the drawing:

Figure 1 is a front view of the hub portion of the wheel.

Fig. 2 is a vertical section of the hub portion of the wheel.

Fig. 3 is a rear view of the hub portion of the wheel and driving means therefor.

In the drawing 1 indicates a skein comprising a wall 2 provided with a vertical diametrically extending slot 3; a forwardly extending annular flange 4, the periphery of which forms a bearing surface; a rearwardly extending annular flange 5; and forwardly extending vertical walls 6 arranged to form a vertical diametrically extending compartment 7 for the resilient means hereinafter described. A rear circular plate 8 fits against the rear face of the wall 2, said plate being provided with an annular rabbet 9 in which fits the flange 5 whereby the plate is centered on the casing 7; a recess 10; and an opening 11. The plate 8 is provided with holes 12 which receive bolts 13 extending rearwardly from the member 1 and nuts 14 screw on the rear ends of said bolts against the plate whereby the plate is secured to said member. A circular plate 15 incloses the front of the casing and skein 1, said plate being provided with a vertical diametrically extending slot 16 and fitting against the front of the flange 4 and is provided with a rabbet 17, which forms a joint between the plate and the end of the flange and centers the plate on said member. Said plate is provided with holes 18 adapted to receive bolts 19 projecting from the end of the flange 4, and nuts 20 screw on the ends of said bolts against the plate and detachably hold the plate in position on the skein 1. The casing 2, plate 8 and plate 15 form the skein.

A hub 25 surrounds the flange 4 with its sides fitting between the outer portion of the plates 2 and 15, said hub being provided with raceways 26 in its inner surface and raceways 27 in its side surfaces, said raceways 26 containing balls 28 which rest upon the periphery of flange 4 and said raceways 27 containing balls 29 which bear against the plates 2 and 15, respectively, whereby the wheel is mounted to turn on ball bearings. The periphery of the flange 4 is convex and the raceways 26 are arranged at opposite sides of the high point of said convex surface whereby the ring 25 is centered on the skein 1. The bearing and hub 25 is provided with recesses 30 adapted to receive the tongues 31 on the inner ends of the wheel spokes 32, which spokes are secured to the hub by means of bolts 35 and nuts 35′ which bolts extend through the ring and tongues 31 and through a flange 36 of an internal gear 37, which flange fits against the rear side of the hub, nuts 35′ screwing against the gear flange and holding the gear in position on the hub. A pinion 40 is keyed on a shaft 41 journaled in plate 8, said pinion meshing with internal gear 37 and driving said gear, and the wheel around the bearing member 1 when the shaft is driven by the engine of the automobile. An automobile axle 50 extends through the opening 11 in plate 8, slot 3 in wall 2, compartment 7, in casing and bearing member 1, and through slot 16 in the front plate 15. The axle has a square part 51, the flat sides of which engage the sides of the slots 3 and 16 and hold the casing and bearing member against turning with the compartment 7 in a vertical position. A plate 52 fits on the axle against the rear end of the square part 51 and rests in the recess 10 covering the opening 11 and slot 3, said plate being of less vertical length than the slot 10 so that the plate and axle may move vertically in said recess. The axle has a thread 53 on which screws a nut 54 against the plate 52 and a lock nut 55 against the nut 54 whereby the nut 54 is locked, which nuts prevent the axle moving to the left through the hub of the wheel. A plate 60 fits on the end of the axle against the plate 15 covering the slot 16 at all times. A nut 61 screws on a thread 62 on the end of the axle against the plate 60 and holds the plate 60 against plate 15 and prevents movement of the axle to the right in the hub. A lock nut 63 screws on the thread 62 against the nut 61 and locks the nut 61 against turning on the thread. Any suitable resilient means is interposed between the axle and the lower and upper walls of the compartment 7 whereby the wheel is resiliently mounted on the axle. Said means as shown in the drawing may be as follows: A spring 70 is interposed in the compartment 7 between the axle part 51 and the lower wall of the compartment 7 which spring resists downward movement of the axle and upward movement of the wheel. A spring 71 is interposed in the compartment 7 between a plate 72, which engages the lower end of the spring and a plunger 73 which engages the upper end of the spring and normally rests against the upper wall of the compartment 7. Shoulders 74 are provided on the inner surfaces of the wall 2 and plate 15 at a point which corresponds to the upper side of the axle part 61 when the axle is in its central position in the wheel upon which shoulders the plate 72 is adapted normally to rest. The plunger has a stem 75 which extends loosely through the plate 72 and the axle part 51, through the lower end of which stem extends a pin 76. Upward movement of the axle or downward movement of the wheel causes the part 51 to engage and lift the plate 72 and compress the spring 71, thus causing the spring 71 to resist said movements of the axle and wheel. Downward movement of the axle, in addition to compressing the spring 70, causes the axle part 51 to engage pin 76 and draw the plunger 73 down and compress the spring 71. Upward movement of the wheel, in addition to compressing spring 70, causes the shoulders 74 to force the plate 72 upwardly and the pin 76 to engage the part 51 and hold the plunger 73 against upward movement, thus compressing the spring 71.

The axle 50, shaft 41 and pinion 40 may be inclosed by a casing 80, which may be bolted to the rear plate 8, the casing being cut away at 81 to enable the pinion to mesh with gear 37.

Having described my invention I claim as new and desire to secure by Letters Patent:

1. In combination, a skein, an axle on which said skein is mounted to move vertically with relation thereto, resilient means in said skein for resisting the relative vertical movement of the skein and axle, a hub rotatively mounted on said skein, the periphery of said skein being convexed in an axial direction, the inner surface of said hub having two raceways arranged at opposite sides of the high point of said convexed periphery, and balls in said raceways rolling on said convexed surface.

2. In a wheel, a skein comprising an annular wall and front and rear walls, said front and rear walls being provided with vertical slots, an axle extending through said slots and through the skein, means for preventing longitudinal movement of the axle in the skein, resilient means for resisting downward movement of the axle and upward movement of the skein, shoulders in the skein above the axle, a plate normally resting on said shoulders, a plunger normally resting against the upper wall of the skein, a spring interposed between said plate and said plunger, a plunger stem extending through said plate and said axle, a pin on the lower end of said stem for engaging the axle, and a hub rotatively mounted on said skein.

In testimony whereof I affix my signature.

BYNUM B. McCROSKY.